Jan. 22, 1963

L. L. SALTON 3,075,063

TEMPERATURE CONTROL SYSTEMS

Filed Jan. 25, 1960

INVENTOR.
LEWIS L. SALTON
BY
AGENT

United States Patent Office 3,075,063
Patented Jan. 22, 1963

3,075,063
TEMPERATURE CONTROL SYSTEMS
Lewis L. Salton, 1361 Madison Ave., New York, N.Y.
Filed Jan. 25, 1960, Ser. No. 4,449
3 Claims. (Cl. 219—20)

This invention pertains to systems for use in controlling temperatures.

Such systems normally employ either heating means or cooling means connected to a control device which regulates the operation of such heating or cooling means in response to the temperature of the control device itself. Such control devices are normally thermostats used so as to either open or close an electrical circuit so as to regulate the operation of such heating or cooling means. A large number of different suitable thermostat constructions are known at the present time.

Such thermostats are either adjustable or non-adjustable depending upon whether or not they can be adjusted so as to vary the temperature at which they serve to regulate such a heating or cooling means. Adjustable thermostats can, of course, be set so as to accomplish a regulating function at various temperatures, while non-adjustable thermostats can only be used to accomplish a regulating function at a specified temperature. For many of the applications it is presently necessary to use such adjustable thermostats since in these applications it is necessary to vary the temperature at which a heating or cooling element or device is operated. However, the use of adjustable thermostats with various heating or cooling devices is frequently disadvantageous and undesirable for several reasons.

One major factor tending to limit the use of adjustable thermostats with heating or cooling devices is the fact that such adjustable thermostats are relatively costly. As a general rule it is cheaper to utilize a non-adjustable thermostat with a heating or cooling element or device than it is to use an adjustable thermostat. Non-adjustable thermostats having explosion proof, corrosion resistant and other desirable characteristics can be manufactured much more inexpensively than adjustable thermostats incorporating these same features or characteristics. Because of these considerations it has heretofore been the practice to utilize non-adjustable thermostats only in cases where a single temperature was to be maintained, and to utilize adjustable thermostats whenever it was necessary to control a heating or cooling element or device so as to operate the same over a range of temperatures.

A purpose or object of the present invention is to permit the use of non-adjustable thermostats wherever it is desired to control a system employing a heating or cooling element or device to provide any substantially constant temperature within a range of temperatures. Another object of the present invention is to provide a very simple, inexpensive method of regulating the temperature of a system employing a heating or cooling device or element anywhere within a range of temperatures. A more specific object of the present invention is to teach the use of non-adjustable thermostats instead of adjustable thermostats in the controlling application of electrically heated food servers and the like over a range of temperatures. Various other objects and advantages of this invention will be apparent from the remainder of this specification.

According to the present invention an element or device used for heating or cooling purposes is controlled by a non-adjustable thermostat which is exposed to heat flow from the region where temperature is to be controlled, and means are provided for varying this heat flow received by the non-adjustable thermostat from said region so as to control its operation. Hence, with this construction the non-adjustable thermostat will always act so as to control the operation of a heating or cooling element or device at a "fixed" temperature as far as the thermostat itself is concerned, but will be operative for controlling such an element or device so that it brings the controlled region to another temperature because of the fact that the heat flow affecting such a thermostat may be varied.

The invention is best more fully explained by referring to the accompanying drawing in which:

FIG. 1 is a perspective view of a food server including a temperature control system of this invention;

FIG. 2 is a schematic view showing the operative parts of this food server;

FIG. 3 is an enlarged, cut-away view in perspective, of a part of the food server shown in FIG. 1; and FIGS. 4, 5 and 6 are views similar to FIG. 3 of other embodiments of this invention.

The accompanying drawing is primarily intended so as to clearly illustrate the character of temperature control systems of this invention. It will be realized from a consideration of this drawing and the remainder of this description that the features of this invention set forth herein and defined in the appended claims may be incorporated within a number of different devices than food servers through the use of routine engineering skill or ability. It will also be realized that the structures employed in temperature control systems as herein described may similarly be varied in accordance with routine engineering skill or ability.

In FIG. 1 of the drawing there is shown a food server 10 utilizing the present invention. This food server 10 is constructed as indicated in the Salton U.S. Patent No. 2,563,875 issued August 14, 1951, except as otherwise indicated herein so as to include an outer metal frame 12, serving to hold a glass plate 14, the undersurface of which is provided with an elongated resistance element 16. An end of this element 16 is connected through a terminal 18 to a conventional, non-adjustable thermostat 20 and a socket 22 by means of wires 24. Another wire 24 connects to the other terminal 18 of the element 16 and the socket 2. The socket 22 is mounted upon the frame 12. Thus, the element 16 and the thermostat 20 are connected in series with one another.

In accordance with this invention the thermostat 20 is mounted upon a small crank arm 26 carried by an extremity of a rotatable shaft 28. This shaft extends through a bearing opening 30 in the frame 12 and carries the small control knob 32 located on the exterior of this frame 12. The shaft 28 is normally held in position by means of a semi-spherical cup-like spring washer 34 which rests against a shoulder 36 on this shaft 28. The shoulder 36 is spaced from the frame 12 so that the washer 34 is held under compression at all times. Thus, by virtue of its resilient character this washer 34 is capable of maintaining the thermostat 20 in any position to which it may be turned.

The operation of the temperature control system of this invention embodied within the server 10 is extremely simple. When the server is to be used the socket 22 is connected to an appropriate source of current. At this time both the resistance elements 16 and the thermostat 20 will be "cool" in that they are at ambient temperature. Because of this the electrical contacts (not shown) within the non-adjustable thermostat 20 will be closed and current will flow through the resistance element 16. As this occurs of course the resistance element 16 will become heated, and heat will be emitted by it through radiation and conduction. Some of this heat will be reaching the thermostat 20, and will cause a temperature rise within this thermostat.

When the temperature within the thermostat 20 reaches a "fixed" temperature at which this thermostat is constructed to operate, the contacts (not shown) within it will open. When this occurs, of course, no further current is applied to the element 16, and the element 16 will gradually cool. Simultaneously, of course, the thermostat 20 will also cool, especially because the element 16 will not emit as much heat as it is cooling as it radiated when current was supplied to it. When the thermostat 20 cools sufficiently so as to reach the "fixed" temperature at which it is constructed to operate the contacts (not shown) within it will close, allowing current to again flow through the element 16.

In accordance with this invention, this system may be set to operate at any temperature over a range of temperatures by turning the knob 32. When the knob 32 is turned the position of the thermostat 20 with respect to the element 16 is changed. The closer the thermostat 20 is rotated to the element 16, the more closely the temperature at which this non-adjustable thermostat will operate so as to open or close the circuit described will correspond to the temperature of the element 16. Similarly, the further the thermostat 20 is rotated from the element 16, the hotter this element must be in order to actuate the thermostat. Hence, with this system of this invention embodied within the server 10 it is possible to use a non-adjustable, conventional thermostat such as the thermostat 20 in order to control the temperature of a heating element, such as the resistance element 16, over a range of temperatures.

Similar control may be accomplished in several other different manners. In FIG. 4 of the drawings there is shown a modified food server 40 of the present invention which is similar to the food server 10 previously described. For this reason, the various parts of the server 40 which are identical to, or substantially identical to corresponding parts of the server 10 are not separately described herein, and are designated by the primes of the numerals previously employed to designated such parts.

In the server 40 the thermostat 20' used is rigidly mounted on a small stand 42 extending from the bottom 44 of the frame 12'. This frame is provided with a slot 46 extending parallel to the plate 14'. This slot carries a small rod 48 which is adapted to slide within it. On the exterior of the frame 12' there is located a small knob 50 which is used in sliding the rod 48 back and forth. Also, a small washer 34' is located against the frame 12' by means of a shoulder 36' upon this rod 48. The extremity of the rod 48 within the server 40 carries a small triangularly shaped shield 56.

When the rod 48 is moved within the slot 46 the shield 56 is moved so as to either expose or cover all or part of the thermostat 20', depending upon the direction at which this rod 48 is moved. When the shield 56 covers substantially all the thermostat 20' obviously the amount of radiation reaching this thermostat 20' directly from the element 16' will be nill, and, hence the thermostat 20' will be heated by the air surrounding it and radiation reflected from the interior of the frame 12' and the bottom 44. Under these conditions the element 16' will be maintained at a higher temperature than the temperature at which the thermostat 20, operates to open and close the circuit employed. When, however, the shield 56 is moved so as to expose substantially all of the thermostat 20' so that radiation from the element 16' directly impinges upon it the element 16' will operate at a temperature which will be much closer to the "fixed" temperature at which the thermostat 20' operates. By moving the shield 56 so that it covers various parts of the thermostat 20' it is possible, of course, to adjust the server 40 so that the thermostat 20' operates at various temperatures.

In FIG. 5 of the drawing there is shown a further modified food server 60 incorporating the present invention. This food server is substantially similar to the server 10 previously described. Because of this various parts of it which are identical to, or substantially identical to corresponding parts of the server 10 are designated by the double primes of the numerals previously employed, and are not separately described herein.

In the server 60 the thermostat 20" is mounted at an end of a shaft 28" secured to the frame 12" as previously indicated. Thus, when this shaft 28" is rotated through the use of the knob 32" the position of the thermostat 20" with respect to the resistance element 16" is not changed. With the server 60 temperature regulation is accomplished through the use of a dark coating 62 such as may be created using black paint, this coating 62 covering at least a part of the surface of this thermostat 20". In the embodiment of the invention illustrated in FIG. 5 this coating 62 extends the length of the thermostat 20" and covers approximately one-half of the surface area of it. Further, the portion of the surface of the thermostat 20" which is not covered by the coating 62 is of a lighter more reflective character than the coating 62 as far as radiation absorbing characteristics are concerned than the coating 62. Thus, if desired, it can be considered that the thermostat 20" is completely covered by a coating, at least part of which is darker than the remainer of this coating.

With this construction the uncoated portion of the thermostat 20" may be rotated so as to be located adjacent to the element 16". When this occurs this uncoated portion of the thermostat 20" will tend to reflect radiation from this resistance element 16" to a substantial extent. Hence, the resistance element 16" will be maintained at a temperature which is higher than the temperature at which the thermostat 20" operates. When, however, this thermostat 20" is rotated so as to locate the dark coating 62 adjacent to the element 16" a greater proportion of the radiation from this resistance element 16" will be absorbed by the thermostat 20". Hence, the thermostat 20" under these conditions will operate so that the element 16" is maintained at a lower temperature which is close to the temperature at which the thermostat 20" is set so as to open or close an electric circuit. Various intermediate temperatures within this range may be achieved by rotating the thermostat 20" so that only a part of the coating 62 is exposed directly to radiation.

In FIG. 6 of the drawing there is shown a still further modified food server 70 incorporating the present invention. This server 70 is also constructed in the same general manner as the server 10 previously described. Because of this various parts of the server 70 which are identical to, or substantially identical to corresponding parts of the server 10 are designated by the triple primes of the numerals previously employed to designate such parts, and are not separately described in this specification.

In the server 70 a small bearing-like stand 72 is secured directly to the bottom 74 of the frame 12''' employed. This stand 72 rotatably carries a shaft 76 located perpendicular to the element 16'''. A small wheel 78 is rotatably held by the shaft 76 so as to be located between the element 16''' and the thermostat 20''' mounted upon this stand 72. The wheel 78 extends out through a slot 80 in the frame 12''' and is provided with a knurled external surface 82 adapted to be used in rotating it.

In the server 70 the wheel 78 is provided with cutout portions extending part-way around the interior of it. These are designed so that the wheel 78 may be turned so as to directly expose the thermostat 20''' to radiation from the element 16'''. When this is done the element 16''' will operate at a temperature closely corresponding to the temperature at which the non-adjustable thermostat 20''' is operative. With this construction however, the wheel 78 may be turned so as to cover substantially all of the thermostat 20'''. When this is done the thermostat 20''' is not directly subjected to radiation from the element 16''', but is, of course, heated by reflected radiation and by the temperature of the ambient air. Under these conditions the element 16''' will operate at a temperature which is hotter than the temperature at which the thermostat 20''' opens or closes the circuit employed. This element 16''' may be maintained at any intermediate temperature between these two temperatures by rotating the wheel 78 so that various proportions of the thermostat 20''' are covered. If desired, the portions 84 of the wheel 78 may be covered with filters or the like which are designed so as to intercept radiation directed toward the thermostat 20'''.

From a consideration of the preceding description of various embodiments of this invention it will be seen that in all of these embodiments the resistance element employed is a "controlled" element. If desired, such controlled elements can be termed "controlled regions" since the present invention is operative in order to regulate the temperature of not only an actual heating element employed but the temperature of any region heated by such a heating element. Similarly in the various embodiments of the invention described the non-adjustable thermostats employed are located in another region of relatively constant temperature adjacent to such first controlled regions. With the present invention a thermostat used is placed relative to the first or controlled region so that the temperature of such first region affects the temperature of the thermostat, operating the thermostat itself. Since in all the embodiments of the invention a non-adjustable thermostat is located so that the effect of the temperature of the first or controlled region on the thermostat itself can be varied, such a thermostat can satisfactorily control the temperature of this first or controlled region while being of a non-adjustable category.

In this specification reference is made to the temperature at which a thermostat operates. Those skilled in the art to which this invention pertains will realize that this is common terminology and it is not, strictly speaking, accurate in a technical sense inasmuch as the temperature at which any thermostat operates is determined by the temperature sensitive part or parts in such thermostats. Thus, in accordance with this invention the temperature of a thermostat unit as a whole is substantially unimportant, and the temperature of the operative part or parts in it is of primary importance. In the usual thermostat employed with the present invention such a temperature sensitive part is a bi-metallic strip, movement of which opens or closes contacts so as to make or break an electric circuit. Normally such a strip will not move in this manner so as to open and close contacts at an exact temperature, but will operate so as to accomplish these results at the extremes of a very small range of temperatures. For convenience such a range is referred to herein as the temperature at which a thermostat operates.

Although the embodiments of the invention set forth in this specification relate to food servers or warmers, it will be apparent to those skilled in the art that the basic features of this invention may be used in other systems for controlling temperatures. Thus, these features are applicable to systems involving the use of controlled cooling elements or devices as well as systems involving controlled heating elements or devices, such as the resistance elements described. For these reasons this invention is to be considered as being limited only by the appended claims forming a part of this disclosure.

I claim:

1. In a heating structure having an upper plate carrying an electrical heating element and means defining an enclosed air space beneath said heating element, the improvement which comprises: a non-adjustable thermostat located within said air space, said thermostat being operatively connected to said heating element so as to be capable of regulating the operation of said heating element, part of the exterior of said thermostat being darker than the remainder of the exterior of said thermostat; and means for supporting said thermostat so that said thermostat is capable of being rotatable in order to locate different parts of the exterior of said thermostat adjacent to said heating element and so that the orientation of said thermostat within said air space with respect to said heating element is capable of being changed in order to control the temperature at which said heating element is operated.

2. A system which includes: a heating element capable of radiating heat; thermostat means responsive to a given temperature for controlling the operation of said heating element mounted adjacent to said heating element and being operatively connected thereto, said thermostat means having an exterior surface, part of said exterior surface being darker than the remainder of said exterior surface; and means for moving said thermostat means so that different parts of said exterior surface of said thermostat means may be located opposite said heating element.

3. In an electrical food warmer having an upper plate, a resistance heating element located upon said plate, means defining an enclosed air space located beneath said upper plate and said heating element, the improvement which comprises: a non-adjustable electrical thermostat located within said air space beneath said heating element, said thermostat being operatively connected to said heating element, said thermostat having exterior surface, part of said exterior surface being darker than the remainder of said exterior surface; and means for rotatably supporting said thermostat within said air space so that different parts of the exterior surface of said thermostat are capable of being located opposite said heating element.

References Cited in the file of this patent

UNITED STATES PATENTS

| | | |
|---|---|---|
| 1,812,722 | Spencer | June 30, 1931 |
| 2,007,596 | Burke | July 9, 1935 |
| 2,124,633 | Robinson | July 26, 1938 |
| 2,459,170 | Koci | Jan. 18, 1949 |
| 2,611,855 | Turner | Sept. 23, 1952 |